United States Patent
Zhang et al.

(10) Patent No.: US 10,009,955 B2
(45) Date of Patent: Jun. 26, 2018

(54) METHOD AND DEVICE FOR PROVIDING SSID IN WLAN

(71) Applicant: Xiaomi Inc., Beijing (CN)

(72) Inventors: Pengfei Zhang, Beijing (CN); Yidong Wang, Beijing (CN); Chuan Peng, Beijing (CN)

(73) Assignee: Xiaomi Inc., Beijing (CN)

( * ) Notice: Subject to any disclaimer, the term of this patent is extended or adjusted under 35 U.S.C. 154(b) by 102 days.

(21) Appl. No.: 14/925,528

(22) Filed: Oct. 28, 2015

(65) Prior Publication Data

US 2016/0119973 A1 Apr. 28, 2016

Related U.S. Application Data

(63) Continuation of application No. PCT/CN2015/074942, filed on Mar. 24, 2015.

(30) Foreign Application Priority Data

Oct. 22, 2014 (CN) .......................... 2014 1 0570720

(51) Int. Cl.
| | |
|---|---|
| *H04W 84/12* | (2009.01) |
| *H04L 12/18* | (2006.01) |
| *H04W 48/12* | (2009.01) |
| *H04W 48/10* | (2009.01) |

(52) U.S. Cl.
CPC ............. *H04W 84/12* (2013.01); *H04L 12/18* (2013.01); *H04W 48/10* (2013.01); *H04W 48/12* (2013.01)

(58) Field of Classification Search
CPC ...... H04W 4/06; H04W 88/08; G06F 17/2223
See application file for complete search history.

(56) References Cited

U.S. PATENT DOCUMENTS

| | | | |
|---|---|---|---|
| 8,060,521 B2 | 11/2011 | Lemar et al. | |
| 8,228,215 B1 | 7/2012 | Runge | |
| 9,608,891 B2 * | 3/2017 | Kollu | .................. H04L 43/0882 |
| 2009/0175250 A1 * | 7/2009 | Mathur | .................. H04W 48/20 |
| | | | 370/338 |
| 2011/0182204 A1 | 7/2011 | Goto | |
| 2013/0201980 A1 * | 8/2013 | Rahul | .................. H04W 88/08 |
| | | | 370/338 |

FOREIGN PATENT DOCUMENTS

| | | |
|---|---|---|
| CN | 101895964 A | 11/2010 |
| CN | 103517385 A | 1/2014 |
| CN | 103929767 A | 7/2014 |

(Continued)

OTHER PUBLICATIONS

International Search Report of PCT Application No. PCT/CN2015/074942 dated Jul. 1, 2015 (4 pages).

(Continued)

*Primary Examiner* — Derrick Ferris
*Assistant Examiner* — The Hy Nguyen
(74) *Attorney, Agent, or Firm* — Finnegan, Henderson, Farabow, Garrett & Dunner LLP

(57) ABSTRACT

This disclosure provides a method for providing a service set identifier (SSID) in a wireless local area network (WLAN). The method includes encoding the SSID with a character encoding for each of one or more default system platforms, to generate one or more SSID codes suitable for the system platforms, and broadcasting the generated SSID codes suitable for the system platforms in the WLAN.

9 Claims, 8 Drawing Sheets

(56) References Cited

FOREIGN PATENT DOCUMENTS

| CN | 104094641 A | 10/2014 |
|---|---|---|
| CN | 104283642 A | 1/2015 |
| JP | 2009-89004 A | 4/2009 |
| KR | 10-2014-0123086 | 10/2014 |
| RU | 2531371 C2 | 10/2014 |
| WO | WO 2010/105192 A1 | 9/2010 |

OTHER PUBLICATIONS

David Westcott et al., "Wireless LAN Topologies" in "Certified Wireless Network Administrator Official Study Guide," Sep. 10, 2014, John Wiley & Sons, Incorporated, XP055339198, ISBN: 978-1-118-89370-8, pp. 237-262.
Russian Office Action issued by the Russian Patent Office dated Jul. 21, 2016, in counterpart Russian Patent Application No. 2015122491/08.
Communication Pursuant to Article 94(3) EPC issued by the European Patent Office dated Feb. 1, 2017, in counterpart European Patent Application No. 15190579.1-1854.
Extended Search Report issued by the European Patent Office dated Feb. 11, 2016 in counterpart European Patent Application No. 15190579.1-1854.
English version of International Search Report issued by the State Intellectual Property Office of the People's Republic of China (SIPO) dated Jul. 1, 2015, in counterpart International Application No. PCT/CN2015/074942.

\* cited by examiner

METHOD AND DEVICE FOR PROVIDING SSID IN WLAN

CROSS-REFERENCE TO RELATED APPLICATIONS

The present application is a Continuation Application of International Application PCT/CN2015/074942, filed Mar. 24, 2015, which is based upon and claims priority to Chinese Patent Application No. 201410570720.1 filed Oct. 22, 2014, the entire contents of all of which are incorporated herein by reference.

TECHNICAL FIELD

The present disclosure generally relates to the field of communication technologies and, more particularly, to a method and a device for providing a service set identifier (SSID) in a wireless local area network (WLAN).

BACKGROUND

In related art, a network device, e.g., a router, broadcasts an SSID as an identification of a network provided by the network device, such that a terminal device receiving the SSID can display the SSID as a network name in a network list.

Conventionally, an SSID may include English letters and numbers. Because users may use a default name as an SSID, such as D-Link, Linksys, DD-WRT, there may be different networks with a same name located in an area. Therefore, some users may use non-English characters, e.g., Chinese characters, to set an SSID, so as to reduce a probability that networks in the same area have the same name. Sometimes, the SSID containing non-English characters may not be correctly displayed on the terminal device.

SUMMARY

According to a first aspect of the present disclosure, there is provided a method for providing a service set identifier (SSID) in a wireless local area network (WLAN). The method includes encoding the SSID with a character encoding for each of one or more default system platforms, to generate one or more SSID codes suitable for the system platforms, and broadcasting the generated SSID codes suitable for the system platforms in the WLAN.

According to a further aspect of the present disclosure, there is provided a device for providing a service set identifier (SSID) in a wireless local area network (WLAN). The device includes a processor and a memory for storing instructions executable by the processor. The processor is configured to perform: encoding the SSID with a character encoding for each of one or more default system platforms, to generate one or more SSID codes suitable for the system platforms; and broadcasting the generated SSID codes suitable for the system platforms in the WLAN.

According to another aspect of the present disclosure, there is provided a non-transitory computer-readable storage medium having stored therein instructions that, when executed by a processor of a network device, cause the network device to perform a method for providing a service set identifier (SSID) in a wireless local area network (WLAN). The method includes encoding the SSID with a character encoding for each of one or more default system platforms, to generate one or more SSID codes suitable for the system platforms, and broadcasting the generated SSID codes suitable for the system platforms in the WLAN.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
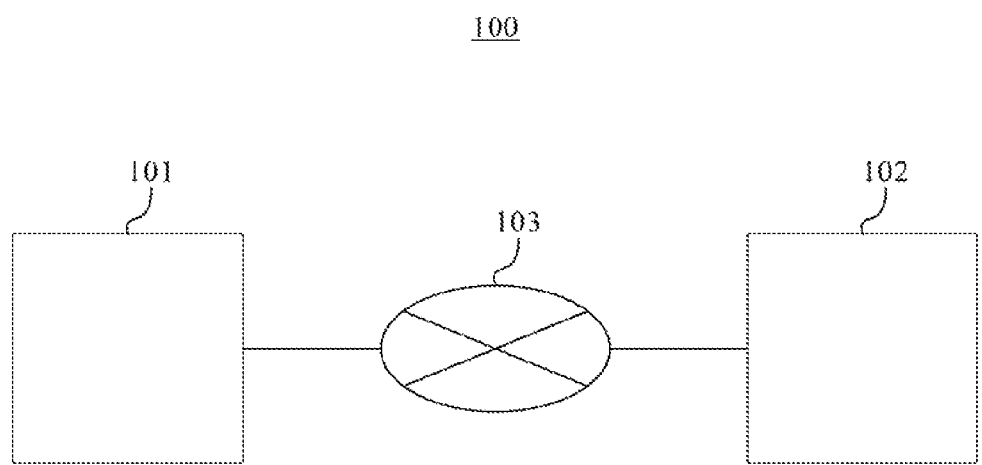
FIG. 1 is a block diagram of a communication system, according to an exemplary embodiment.

FIG. 1 is a block diagram of a communication system 100 for providing an SSID in a WLAN, according to an exemplary embodiment. The system 100 includes a network device 101 (such as a router, a wireless access point, and a wireless controller, etc.), and a terminal device 102 (such as a smart phone, a tablet computer, a desktop computer, etc.) communicating with the network device through a WLAN 103. Although one network device 101 and one terminal device 102 are illustrated in FIG. 1, the number of the devices is not limited. The network device 101 and the terminal device 102 are coupled to each other and may transmit data to each other through the WLAN 103.

Figure 2:
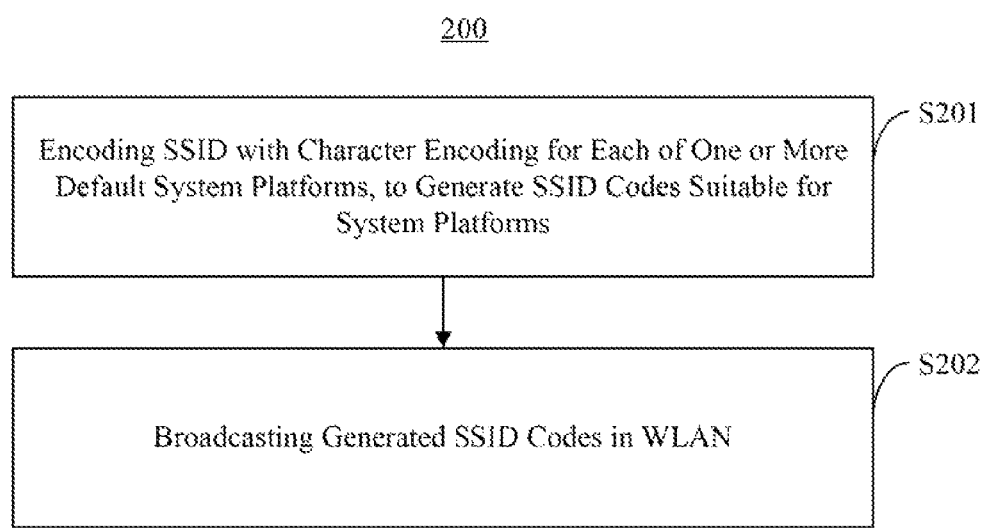
FIG. 2 is a flow chart of a method for providing an SSID in a WLAN, according to an exemplary embodiment.

FIG. 2 is a flow chart of a method 200 for providing an SSID in a WLAN, according to an exemplary embodiment. The method 200 may be performed by the network device 101 (FIG. 1), such as a router, a wireless access point, a wireless controller, etc. Referring to FIGS. 1 and 2, the method 200 includes the following steps.

In step S201, the network device 101 encodes an SSID with a character encoding for each of one or more default system platforms, to generate one or more SSID codes suitable for the system platforms.

In step S202, the network device 101 broadcasts the generated SSID codes suitable for the system platforms in the WLAN 103.

In one exemplary embodiment, the default system platforms include a Windows system platform and a system platform utilizing a universal character encoding. For example, the Windows system platform utilizes a character encoding of the Windows system platform. Also for example, an Android system platform and an Apple system platform utilize the universal character encoding. The types of system platforms are not limited in the present disclosure.

For example, in step S201, the network device 101 may encode the SSID with the character encoding of the Windows system platform and the universal character encoding, to generate a first SSID code and a second SSID code, respectively. Here, the first SSID code is suitable for the Windows system platform, and the second SSID code is suitable for the system platform utilizing the universal character encoding, e.g., the second SSID code is suitable for the Apple system platform and the Android system platform.

In step S202, the network device 101 broadcasts the first SSID code and the second SSID code in the WLAN, such that a terminal device receives the first SSID code and the second SSID code. When the terminal device utilizes the Windows system platform, the first SSID code may be properly displayed, and when the terminal device utilizes the Apple system platform or the Android system platform, the second SSID code may be properly displayed. Thus, the terminal device may properly display the SSID.

In some embodiments, step S202 may include broadcasting the generated SSID codes and indications of the character encoding corresponding to the SSID codes, respectively, in the WLAN, such that the terminal device can select and display an SSID code corresponding to a local character encoding employed by the terminal device based on the broadcasted SSID codes and the corresponding character encoding.

For example, in step S201, the network device 101 encodes the SSID with the character encoding of the Windows system platform and the universal character encoding, to generate the first SSID code and the second SSID code, respectively. The first SSID code is suitable for the Windows system platform, and the second SSID code is suitable for the system platform utilizing the universal character encoding.

In step S202, the network device 101 broadcasts the first SSID code and the indication of the corresponding character encoding of the Windows system platform, and the second SSID code and the indication of the corresponding universal character encoding in the WLAN. For example, a field may be added to a message for broadcasting the SSID codes, and the indications of the character encoding corresponding to the SSID codes may be included in the added field.

In some embodiments, after receiving the indications of the character encoding corresponding to the SSID codes, the terminal device 102 (FIG. 1) selects the SSID code corresponding to the local character encoding to display. For example, if it utilizes the Android system platform, the terminal device 102 selects the second SSID code corresponding to the universal character encoding to display, rather than selecting the first SSID code. Thus, the terminal device 102 may avoid incorrectly displaying an SSID.

Consistent with embodiments of the present disclosure, an SSID is encoded according to a character encoding for each of a plurality of default system platforms, and the generated SSID codes are broadcasted in the WLAN. Thus, a probability for a terminal device to receive an SSID code that can be properly displayed locally is increased, so as to increase a probability for the terminal device to correctly display the SSID.

Figure 3:
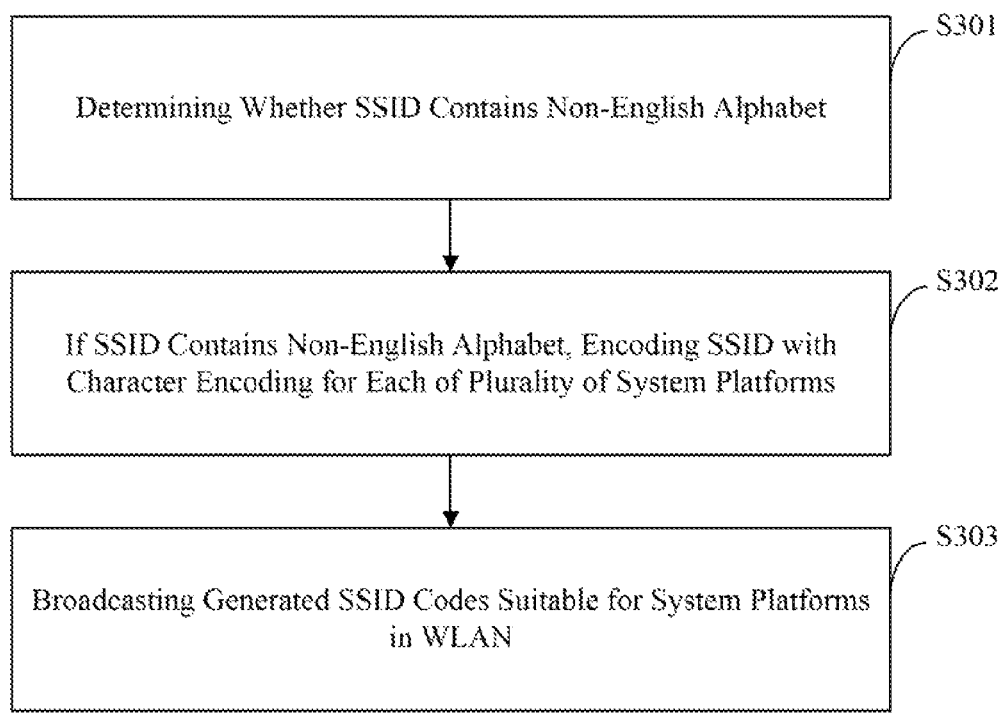
FIG. 3 is a flow chart of a method for providing an SSID in a WLAN, according to an exemplary embodiment.

FIG. 3 is a flow chart of a method 300 for providing an SSID in a WLAN, according to an exemplary embodiment. The method 300 may be performed by the network device 101 (FIG. 1), such as a router, a wireless access point, a wireless controller, etc. Referring to FIGS. 1 and 3, the method 300 includes the following steps.

In step S301, the network device 101 determines whether the SSID contains a non-English alphabet, such as a Chinese character.

In step S302, if it is determined that the SSID contains a Chinese character, the network device 101 encodes the SSID with a character encoding for each of a plurality of default system platforms.

In step S303, the network device 101 broadcasts the generated SSID codes suitable for the system platforms in the WLAN.

If it is determined that the SSID does not contain a non-English alphabet, the network device 101 broadcasts the SSID without encoding the SSID.

The above technical solutions according to the present embodiments may bring the following effects. Generally, when the terminal device 102 incorrectly displays an SSID, it is because the SSID contains a non-English alphabet, such as a Chinese character. In the present embodiment, when the network device 101 determines that the SSID contains, for example, a Chinese character, it encodes the SSID according to the character encoding for each of a plurality of default system platforms and broadcasts the generated SSID codes suitable for the system platforms in the WLAN. Thus, a probability for the terminal device to correctly display the SSID is increased. The network device 101 may not encode the SSID if the SSID does not contain a Chinese character, so as to save network resources.

Figure 4:
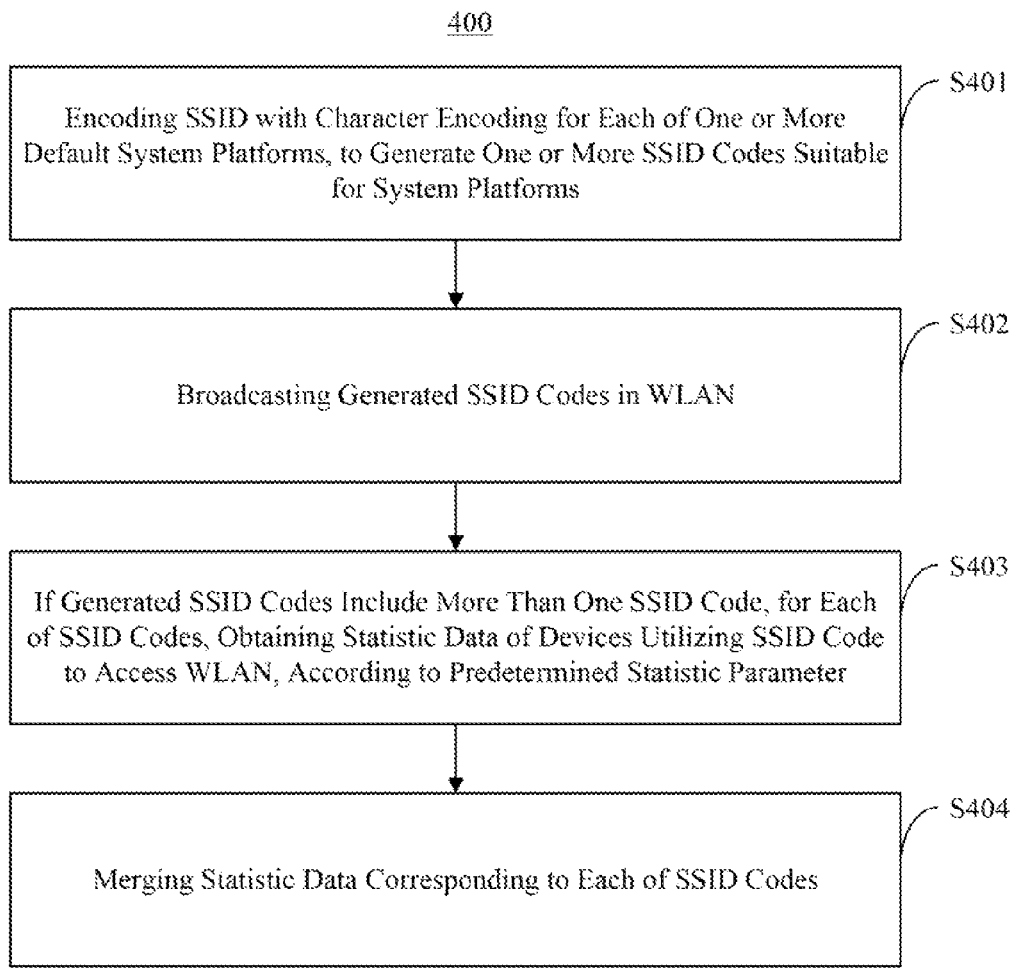
FIG. 4 is a flow chart of a method for providing an SSID in a WLAN, according to an exemplary embodiment.

FIG. 4 is a flow chart of a method 400 for providing an SSID in a WLAN, according to an exemplary embodiment. The method 400 may be performed by a network device, such as a router, a wireless access point, a wireless controller, etc. Referring to FIGS. 1 and 4, the method 400 includes the following steps.

In step S401, the network device 101 encodes an SSID with a character encoding for each of one or more default system platforms, to generate one or more SSID codes suitable for the system platforms.

In step S402, the network device 101 broadcasts the generated SSID codes suitable for the system platforms in the WLAN.

In step S403, if the generated SSID codes include more than one SSID code, for each of the SSID codes, the network device 101 obtains statistic data of devices that utilize the SSID code to access the WLAN, according to a predetermined statistics parameter. For example, the parameter may include a number of accessing devices and/or data traffic.

In step S404, the network device 101 merges the statistic data of each of the SSID codes so that the merged statistic data can represent the statistic data of the SSID, which is used to generate the SSID codes.

For example, in step S401, the SSID is encoded with the character encoding of Windows system platform and the universal character encoding, to generate a first SSID code and a second SSID code, respectively. The first SSID code is suitable for the Windows system platform, and the second SSID code is suitable for the system platform utilizing the universal character encoding. In step S403, a number of devices and data traffic of the devices that utilize the first or second SSID codes to access the WLAN are obtained, respectively. In step 404, the numbers of the devices corresponding to the first SSID code and the second SSID code are merged, and the data traffic corresponding to the first SSID code and the data traffic corresponding to the second SSID code are merged as well. The merged number of the devices represents the number of the devices accessing the network corresponding to the SSID, and the merged data traffic represents the data traffic corresponding to the SSID.

The technical solutions according to the present embodiments may bring the following effects. For example, statistic data may be obtained for each of the SSID codes, and the statistic data can be merged for the SSID that is used to generate the SSID codes. Thus, accurate statistic data of the network corresponding to the SSID may be determined to facilitate control of the network in subsequent operations by utilizing the statistic data.

Figure 5:
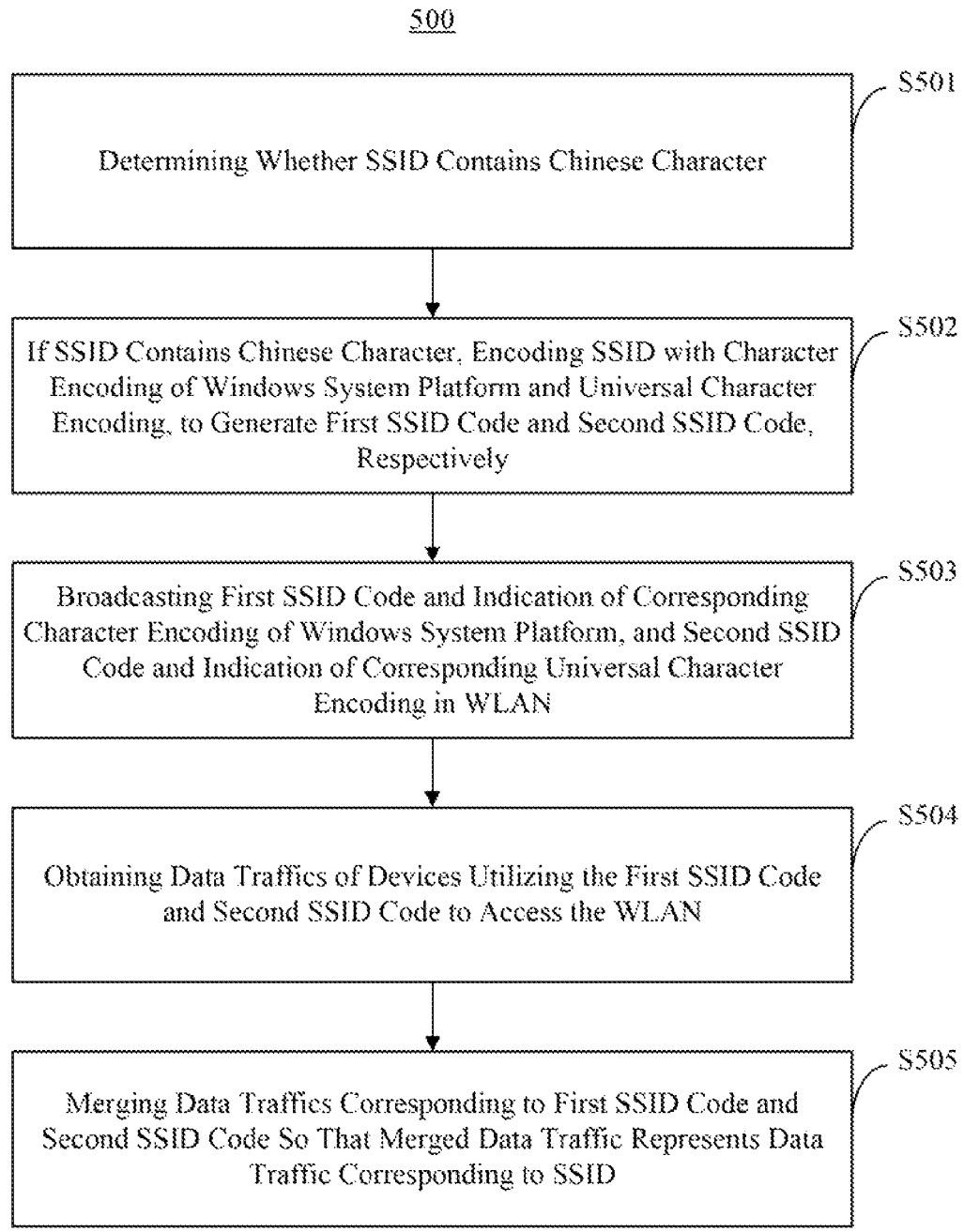
FIG. 5 is a flow chart of a method for providing an SSID in a WLAN, according to a first exemplary embodiment.

FIG. 5 is a flow chart of a method 500 for providing an SSID in a WLAN, according to an exemplary embodiment. In this embodiment, a network device, such as a router, broadcasts an SSID in a WLAN. The SSID is set to "我的 WIFI", which contains Chinese characters meaning my WiFi. Default system platforms include a Windows system platform and a system platform utilizing the universal character encoding Data traffic is selected as the predetermined parameter for obtaining statistic data. Referring to FIGS. 1 and 5, the method 500 includes the following steps.

In step S501 the network device 101 determines whether the SSID contains a Chinese character.

For example, the network device 101 determines whether the SSID "我的 WIFI" contains a Chinese character.

In step S502, if it is determined that the SSID contains a Chinese character, the network device 101 encodes the SSID with the character encoding of the Windows system platform and the universal character encoding, to generate a first SSID code and a second SSID code, respectively.

In the exemplary embodiment, the first SSID code is suitable for the Windows system platform, and the second SSID code is suitable for the system platform utilizing the universal character encoding.

In step S503, the network device 101 broadcasts the first SSID code and the indication of the corresponding character encoding of the Windows system platform, and the second SSID code and the indication of the corresponding universal character encoding in the WLAN.

In this way, a first terminal device such as the terminal device 102 (FIG. 1), which utilizes the Windows system platform, upon receiving the first SSID code and the second SSID code, may select the first SSID code which has the same character encoding as the local character encoding employed by the first terminal device for display. The SSID can be correctly displayed on the terminal device 102. A second terminal device, which utilizes the Android system platform, upon receiving the first SSID code and the second SSID code, may select the second SSID code which has the same character encoding as the local character encoding employed by the second terminal device for display. The SSID can be correctly displayed on the second terminal device as well.

In step 504, the network device 101 obtains data traffic of the devices utilizing the first SSID code and the second SSID code to access the WLAN.

In step 505, the network device 101 merges the data traffic corresponding to the first SSID code and the data traffic corresponding to the second SSID code so that the merged data traffic can represent the data traffic of the SSID, which is used to generate the first and second SSID codes.

For example, the first terminal device utilizes the first SSID code to access the WLAN, and the second terminal device utilizes the second SSID code to access the WLAN. The data traffic of the first terminal device and the data traffic of the second terminal device are obtained and merged, and the merged data traffic can represent the data traffic of the SSID.

The above technical solutions according to the present embodiments include the following effects. An SSID is encoded with character encodings for a plurality of default system platforms, and the generated SSID codes are broadcasted in the WLAN. Thus, a probability for a terminal device to receive an SSID code which may be properly displayed locally is increased, so as to increase a probability for the terminal device to correctly display the SSID. Further, accurate statistic data of the network corresponding to the SSID can be obtained, to facilitate control of the network in subsequent operations by utilizing the statistic data.

Figure 6:
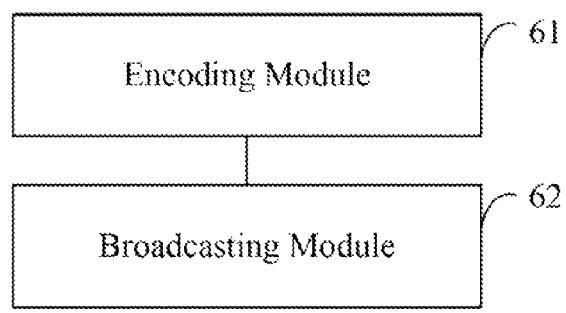
FIG. 6 is a block diagram of a device for providing an SSID in a WLAN, according to an exemplary embodiment.

FIG. 6 is a block diagram of a device 600 for providing an SSID in a WLAN, according to an exemplary embodiment. The device 600 may be the network device 101 (FIG. 1) such as such as a router, a wireless access point, a wireless controller, etc. The device 600 includes an encoding module 61 configured to encode an SSID according to character encodings for one or more default system platforms, to generate one or more SSID codes suitable for the one or more system platforms; and a broadcasting module 62 configured to broadcast the generated SSID codes suitable for the one or more system platforms in the WLAN.

Figure 7:
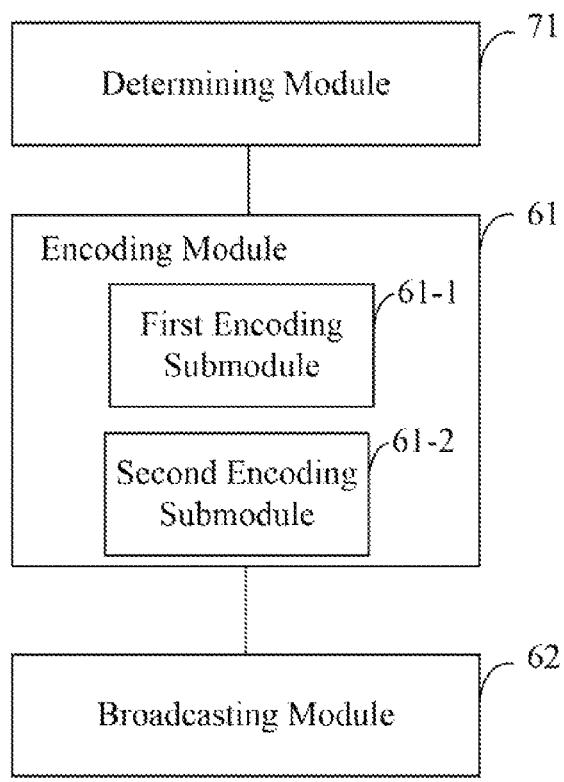
FIG. 7 is a block diagram of a device for providing an SSID in a WLAN, according to still another exemplary embodiment.

In another embodiment, as shown in FIG. 7, a device 700 for providing an SSID in a WLAN may include a determining module 71 configured to determine whether the SSID contains a non-English alphabet, such as a Chinese character, before the SSID is encoded. The device 700 further includes the encoding module 61, and the broadcasting module 62 (FIG. 6). In some embodiments, the encoding module 61 may include a first encoding submodule 61-1 configured to, if the SSID contains a Chinese character, encode the SSID according to the character encodings for the system platforms.

Figure 8:
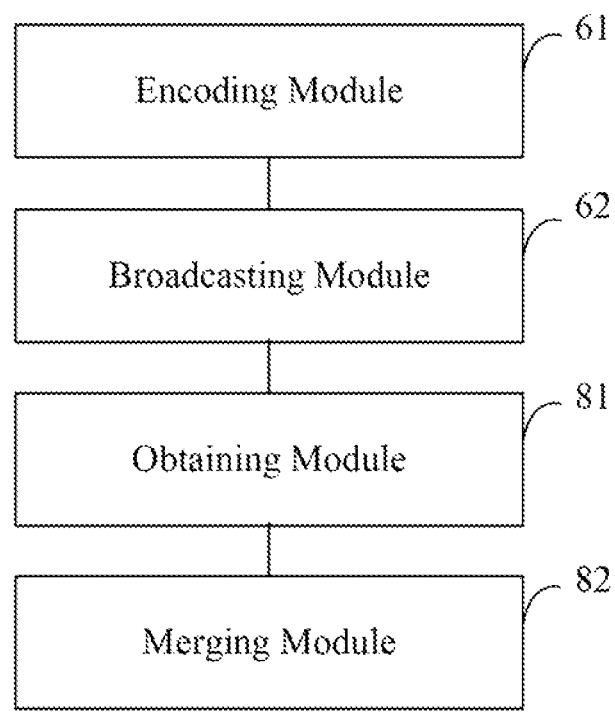
FIG. 8 is a block diagram of a device for providing an SSID in a WLAN, according to an exemplary embodiment.

In another embodiment, as shown in FIG. 8, a device 800 for providing an SSID in a WLAN may include the encoding module 61 and the broadcasting module 6 (FIG. 6), and further include an obtaining module 81 configured to, if the number of generated SSID codes is greater than one, for each of the SSID codes, obtain statistic data of devices that utilize the SSID code to access the WLAN according to a predetermined statistic parameter; and a merging module 82 configured to merge the statistic data corresponding to each of the SSID codes so that the merged statistic data can represent statistic data corresponding to the SSID, which is used to generate the SSID codes.

In some embodiments, referring back to FIG. 7, when the default system platforms include a Windows system platform and a system platform utilizing a universal character encoding, the encoding module 61 may further include a second encoding submodule 61-2 configured to encode the SSID with a character encoding of the Windows system platform and the universal character encoding, to generate a first SSID code and a second SSID code, respectively. The first SSID code is suitable for the Windows system platform, and the second SSID code is suitable for the system platform utilizing the universal character encoding.

In some embodiments, the predetermined statistic parameter includes a number of accessing devices and/or data traffic.

In some embodiments, the broadcasting module 62 is further configured to broadcast the generated SSID codes and indications of the character encoding corresponding to the generated SSID codes in the WLAN, such that a terminal device can select the SSID code corresponding to a local character encoding employed by the terminal device for display, according to the broadcasted SSID code and the corresponding character encoding.

Figure 9:
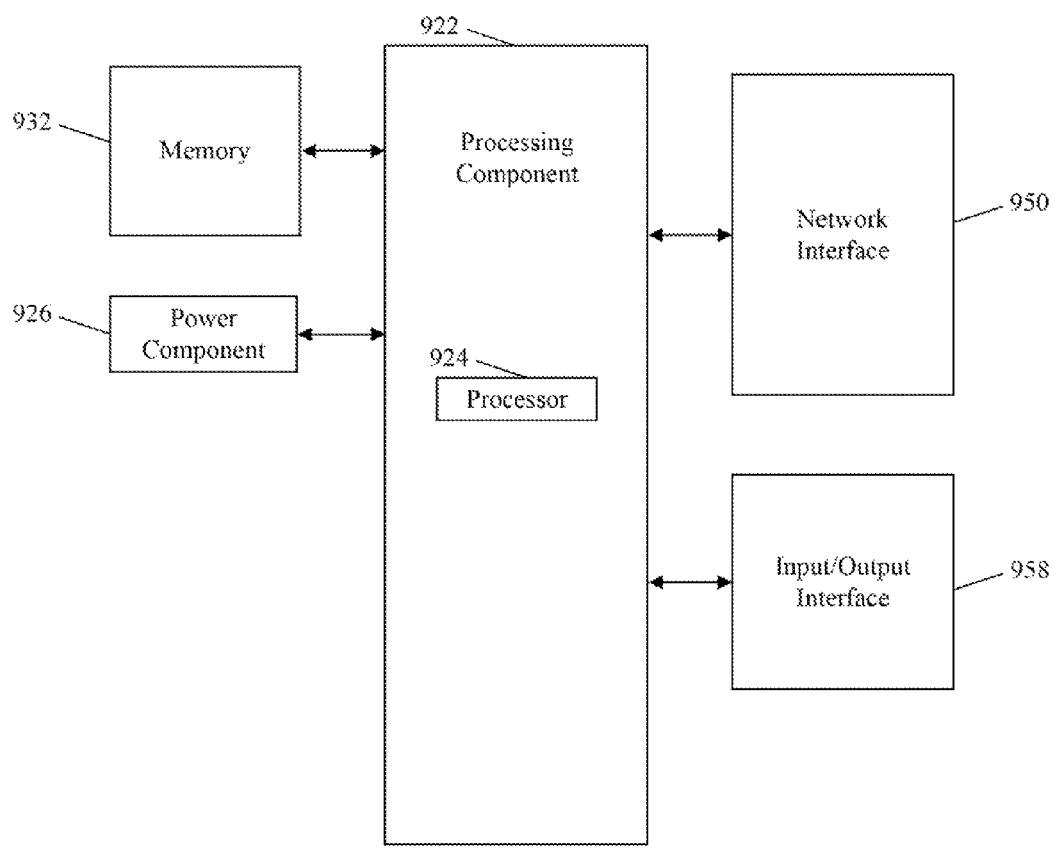
FIG. 9 is a block diagram of a device for providing an SSID in a WLAN, according to an exemplary embodiment.

FIG. 9 is a block diagram of a device 900 for providing an SSID in a WLAN, according to an exemplary embodiment. For example, the device 900 may be provided as a network device, such as a router, a wireless access point, a wireless controller, etc. Referring to FIG. 9, the device 900 includes a processing component 922 that further includes one or more processors 924, and memory resources represented by a memory 932 for storing instructions executable by the processing component 922, such as application programs. The application programs stored in the memory 932 may include one or more modules each corresponding to a set of instructions. Further, the processing component 922 is configured to execute the instructions to perform the above described method for providing an SSID in a WLAN.

The device 900 may also include a power component 926 configured to perform power management of the device 900, wired or wireless network interface(s) 950 configured to connect the device 900 to a network, and an input/output (I/O) interface 958. The device 900 may operate based on an operating system stored in the memory 932, such as Windows Server™, Mac OS X™, Unix™, Linux™, FreeBSD™, or the like.

In some embodiments, the processor 924 is configured to perform encoding a SSID with one or more character encodings for one or more default system platforms, to generate one or more SSID codes suitable for the system platforms; and broadcasting the generated SSID codes suitable for the system platforms in the WLAN.

The processor 924 is further configured to, prior to encoding the SSID, determine whether the SSID contains a non-English alphabet, such as Chinese character. If the SSID contains a non-English alphabet, the processor 924 is configured to encode the SSID according to the character encodings for the system platforms.

The processor 924 is further configured to perform, if the number of the generated SSID codes is more than one, for each of the SSID codes, obtaining statistic data of devices that utilize the SSID code to access the WLAN, according to a predetermined statistic parameter; and merging statistic data corresponding to each of the SSID codes so that the merged statistic data can represent statistic data corresponding to the SSID.

The processor 924 is also configured to perform, if the default system platforms include a Windows system platform and a system platform utilizing a universal character encoding, encoding the SSID with character encoding of the Windows system platform and the universal character encoding, to generate a first SSID code and a second SSID code, respectively. The first SSID code is suitable for displaying in the Windows system platform, and the second SSID code is suitable for displaying in the system platform utilizing the universal character encoding.

The processor 924 is also configured to broadcast the generated SSID codes and indications of the character encoding corresponding to the generated SSID codes in the WLAN, such that a terminal device can select the SSID code consistent with a local character encoding for display, according to the broadcasted SSID code and the corresponding character encoding.

In exemplary embodiments, there is also provided a non-transitory computer-readable storage medium including instructions, such as included in the memory 932, executable by the processor 924 in the device 900, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing a service set identifier (SSID) in a wireless local area network (WLAN) for a plurality of terminal devices operating in different system platforms, the different system platforms including a first system platform using a non-universal character encoding and a second system platform using a universal character encoding, the method comprising:
   determining whether the SSID contains a Chinese character;
   if the SSID contains a Chinese character, encoding the SSID with the non-universal character encoding to generate a first SSID code and encoding the SSID with the universal character encoding to generate a second SSID code, the first SSID code and the second SSID code being differently encoded SSID codes representing the same SSID, wherein the first SSID code is a first new encoded SSID representing the same SSID, and the second SSID code is a second new encoded SSID representing the same SSID; and
   broadcasting, in the WLAN, the first and second SSID codes to the plurality of terminal devices to increase probabilities for the plurality of terminal devices to correctly display the SSID.

2. The method according to claim 1, further comprising:
   for each of the first and second SSID codes, obtaining statistic data of terminal devices utilizing the first or second SSID code to access the WLAN, according to a predetermined statistic parameter; and merging the obtained statistic data corresponding to each of the first and second SSID codes so that the merged statistic data represents statistic data corresponding to the SSID.

3. The method according to claim 2, wherein the predetermined statistic parameter comprises at least one of a number of accessing devices or data traffic.

4. The method according to claim 1, wherein the broadcasting of the first and second SSID codes comprises:
broadcasting the first and second SSID codes and indications of the character encoding corresponding to the first and second SSID codes in the WLAN, to enable a terminal device to select an SSID code corresponding to a local character encoding employed by the terminal device for display.

5. Apparatus for providing a service set identifier (SSID) in a wireless local area network (WLAN) for a plurality of terminal devices operating in different system platforms, the different system platforms including a first system platform using a non-universal character encoding and a second system platform using a universal character encoding, the apparatus comprising:
a processor; and
a memory for storing instructions executable by the processor;
wherein the processor is configured to perform:
determining whether the SSID contains a Chinese character;
if the SSID contains a Chinese character, encoding the SSID with the non-universal character encoding to generate a first SSID code and encoding the SSID with the universal character encoding to generate a second SSID code, the first SSID code and the second SSID code being differently encoded SSID codes representing the same SSID, wherein the first SSID code is a first new encoded SSID representing the same SSID, and the second SSID code is a second new encoded SSID representing the same SSID; and
broadcasting, in the WLAN, the first and second SSID codes to the plurality of terminal devices to increase probabilities for the plurality of terminal devices to correctly display the SSID.

6. The apparatus according to claim 5, wherein the processor is further configured to perform:
for each of the first and second SSID codes, obtaining statistic data of terminal devices utilizing the first or second SSID code to access the WLAN, according to a predetermined statistic parameter; and
merging the obtained statistic data corresponding to each of the first and second SSID codes so that the merged statistic data represents statistic data corresponding to the SSID.

7. The apparatus according to claim 6, wherein the predetermined statistic parameter comprises at least one of a number of accessing devices or data traffic.

8. The apparatus according to claim 5, wherein the processor is further configured to perform:
broadcasting the first and second SSID codes and indications of the character encoding corresponding to the first and second SSID codes in the WLAN, to enable a terminal device to select an SSID code corresponding to a local character encoding employed by the terminal device for display.

9. A non-transitory computer-readable storage medium having stored therein instructions that, when executed by a processor of a network device, cause the network device to perform a method for providing a service set identifier (SSID) in a wireless local area network (WLAN) for a plurality of terminal devices operating in different system platforms, the different system platforms including a first system platform using a non-universal character encoding and a second system platform using a universal character encoding, the method comprising:
determining whether the SSID contains a Chinese character;
if the SSID contains a Chinese character, encoding the SSID with the non-universal character encoding to generate a first SSID code and encoding the SSID with the universal character encoding to generate a second SSID code, the first SSID code and the second SSID code being differently encoded SSID codes representing the same SSID, wherein the first SSID code is a first new encoded SSID representing the same SSID, and the second SSID code is a second new encoded SSID representing the same SSID; and
broadcasting, in the WLAN, the first and second SSID codes to the plurality of terminal devices to increase probabilities for the plurality of terminal devices to correctly display the SSID.

* * * * *